April 19, 1949.  J. SCOTT  2,467,633
REFRIGERATION
Filed Nov. 14, 1946  2 Sheets-Sheet 1
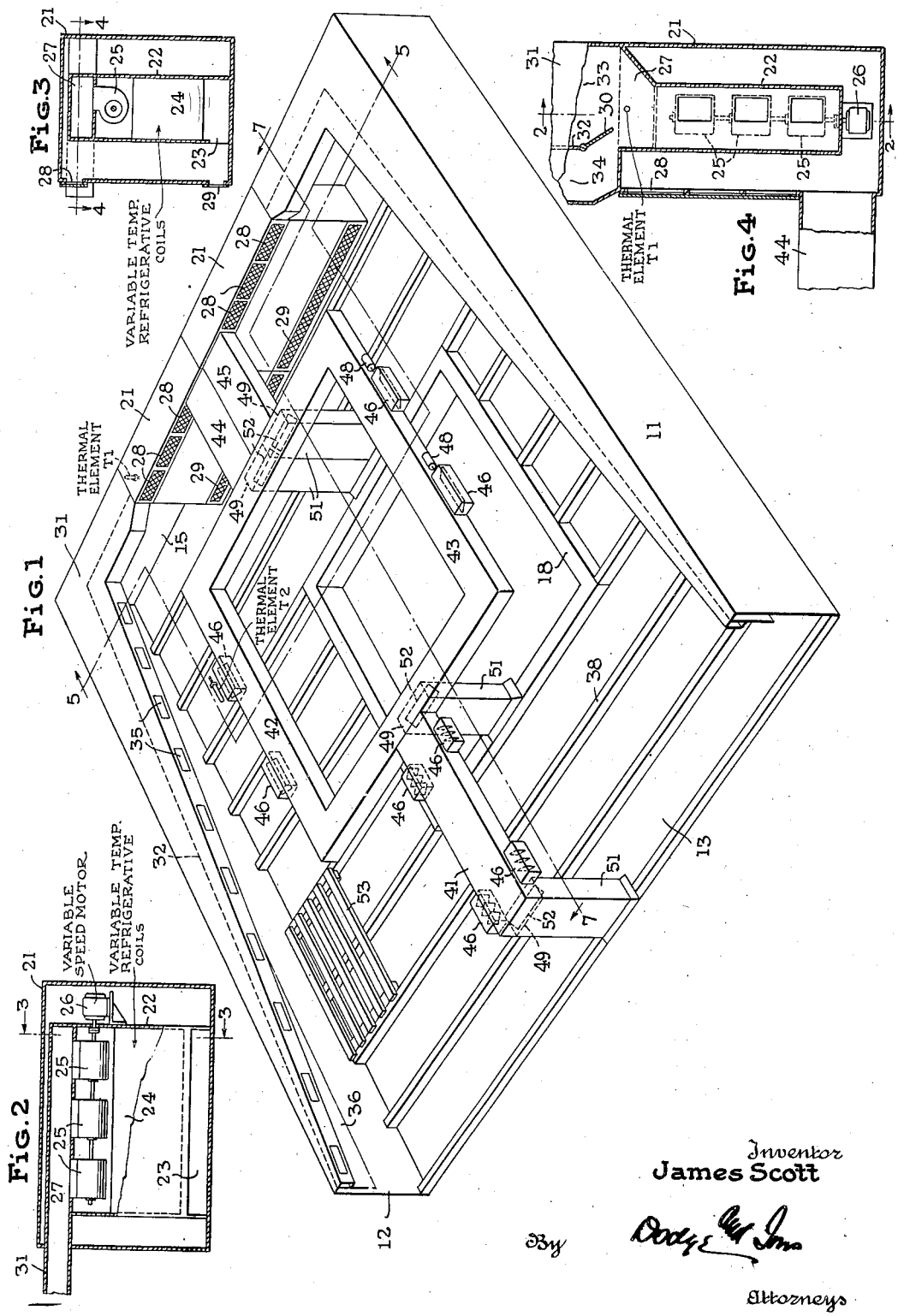
Inventor
James Scott
By Dodge
Attorneys April 19, 1949.     J. SCOTT     2,467,633
REFRIGERATION
Filed Nov. 14, 1946                                    2 Sheets-Sheet 2
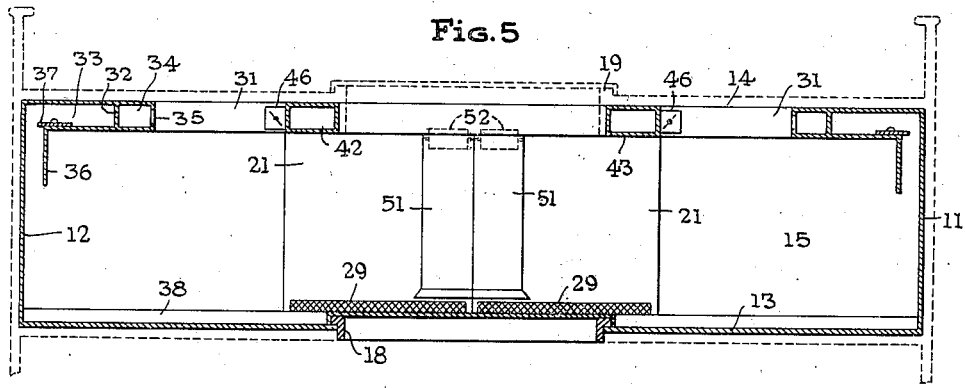
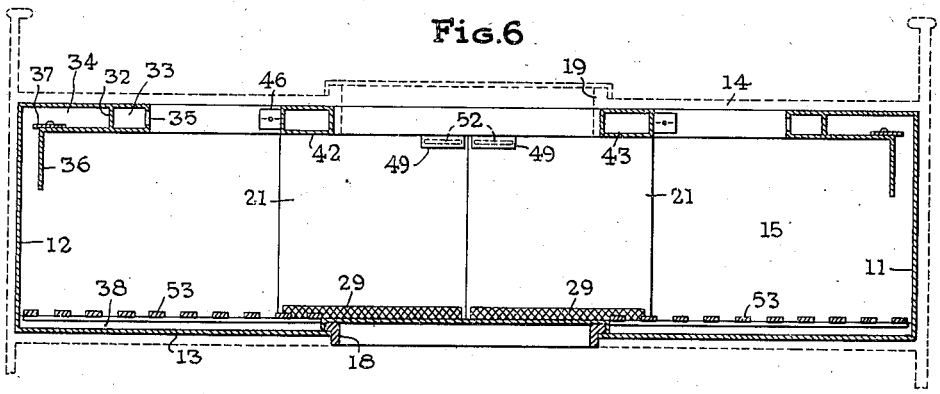
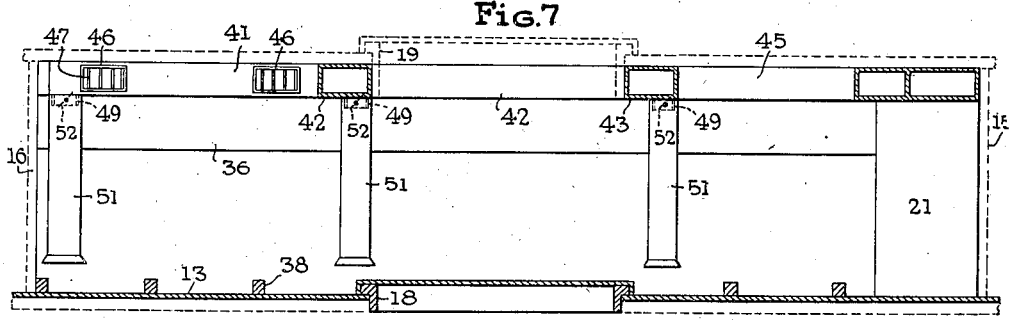
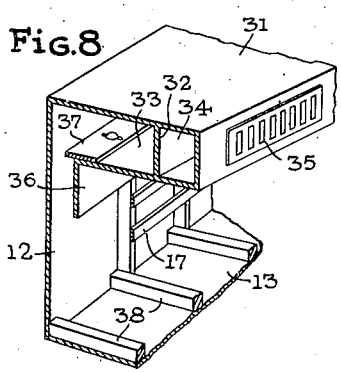
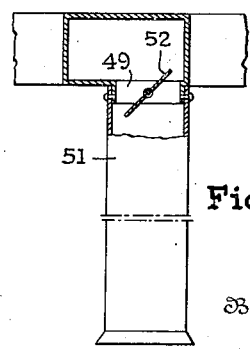
Inventor
James Scott
By Dodge
Attorneys Patented Apr. 19, 1949

2,467,633

UNITED STATES PATENT OFFICE 2,467,633

REFRIGERATION

James Scott, York, Pa., assignor to York Corporation, York, Pa., a corporation of Delaware Application November 14, 1946, Serial No. 709,841

9 Claims. (Cl. 62—102)

This invention relates to refrigeration, and particularly to the construction and arrangement of refrigerated storage spaces so that they can be used for various types of foodstuffs requiring wholly different conditions.

Satisfactory preservation of chilled meats (i. e. carcasses which are chilled but not frozen before being put into storage) requires the minimum practicable air circulation in contact with the meat, and close control of the condition of the air. With certain generally accepted systems the permissible temperature range is notably small. Control requires circulation and the problem here is to ensure control with the minimum practicable circulation of air in contact with the meat.

Other materials such as frozen foods, live produce, and wrapped or packed produce require active air circulation.

A storage room suited for one type of storage has heretofore been unsuited for the other. For example, the usual gravity circulation system with bare refrigerative coils is generally satisfactory for chilled meats, and objectionable for frozen foods and live produce.

There is a heretofore unfilled need for a storage system which can be readily operated in either of two different ways, one of which is satisfactory for chilled meats and the other satisfactory for the different types of material above specified.

The present invention supplies this demand by using in an insulated room an air circulation system which, when arranged for chilled meats, causes an envelope of refrigerated air to flow under and close to the ceiling of the storage space, then down the side and end walls (either or both) and then across the floor to return ducts which lead it back to the refrigerating surface. This minimizes flow in contact with the closely hung carcasses which are chilled when hung and form a nearly solid core in the storage space; but affords effective means to absorb heat at the very areas where in-leakage of heat tends to occur. Practically no heat is generated in such chilled meat, so that the circulating heat-absorbing air envelope is sufficient to maintain the conditions required.

If live produce or frozen foods are to be stored in the room, the return ducts from the floor are closed (or preferably removed), the material is stacked on gratings and with intervening air flow spaces and dampers are so set that the air is forced to return from the floor upward in contact with the stored material.

The refrigerative units which chill the air are of ample surface to carry the load with coil temperatures near enough to that of the circulating air to avoid excessive dehydration of the air. Control can be based on the temperature difference between air leaving and air returning to the refrigerative unit.

When storing chilled meat, if the temperature differential tends to exceed a chosen limit dampers are adjusted to cause some of the air to return upward from the floor in contact with the meat. If the differential tends to become unduly small air circulation is reduced, preferably by slowing the circulating fan.

When storing live produce or frozen foods, if the temperature differential tends to increase beyond a chosen limit, the temperature of the refrigerating unit is raised slightly and vice versa.

The above controls may be made automatic by the use of conventional apparatus. The ability to use the same temperature-sensing units for each type of control is a great advantage, but is overshadowed by the ready convertibility of the entire plant.

The invention is available for use with any storage space. It was developed for use in the cargo space of ships, to meet the need for a system which would protect diverse types of cargo going out and returning.

With a ship the use of a dual refrigerating unit is ordinarily insisted upon, and the problem of installation is complicated by space and form requirements peculiar to ships.

To enable all these features to be disclosed, the invention will be described as applied to the thermally insulated cargo space of a ship.

Though ship terminology will be used, it will readily be understood that the deck corresponds to the floor and the deck-head to the ceiling of a storage room, while the ship-sides and bulkheads correspond to the sides or ends of such room. These terms of description and the term "cargo" are used in a general sense and merely for convenience in description, without implying limitation of the invention to this particular field.

A preferred embodiment of the invention will now be described by reference to the accompanying drawings, in which:

Fig. 1 is a perspective view of a cargo space equipped according to the invention. In this view the near bulkhead end of the cargo space is broken away.

Fig. 2 is a longitudinal section through one of two refrigerative units required by the layout of Fig. 1.

Fig. 3 is a transverse vertical section through the unit shown in Fig. 2 on the line 3—3.

Fig. 4 is a section on the line 4—4 of Fig. 3.

Figs. 5 and 6 are sections on the line 5—5 of Fig. 1, Fig. 5 showing the space arranged for meat and Fig. 6 showing it arranged for other cargo.

Fig. 7 is a section on the line 7—7 of Fig. 1 showing the space arranged for meat.

Fig. 8 is a fragmentary detail of the duct work.

Fig. 9 shows one of the removable extension return ducts used with meat cargoes.

Fig. 10 shows how the duct may be removed, the connection being closed by a damper.

The cargo space is enclosed by ship-sides 11 and 12, deck 13, deck-head 14 and bulkheads 15 and 16. All are thermally insulated but this standard detail of construction is not illustrated. The ship-sides and bulkheads have sparring 17 to ensure the maintenance of air passages down the ship-sides and bulkhead. Because of the small scale of the other figures, this detail is illustrated only in Fig. 8. There is a hatchway at 18 in the deck, and above it another at 19 in the deck-head. These hatchways are closed by hatches indicated in the drawing whenever the cargo space is in use.

Against the bulkhead 15 are two plenum chambers 21, each enclosing a refrigerative unit comprising a housing 22 with air inlet 23, evaporator coils 24, a gang of fans 25 driven by motor 26 and a discharge duct 27 which leads out of the plenum chamber, as shown in Fig. 2. The units in the two plenum chambers are duplicates except that their discharge ducts extend in opposite directions.

Return air from the cargo space enters the plenum space either through the top grilles 28 or the bottom grilles 29 selectively. For meat the top grilles are battened closed as indicated in Fig. 3. For other cargo the bottom grilles are battened closed. Battens are preferred to dampers because they are tighter.

Since the two halves of the cargo space are mirror duplicates, it will suffice to describe one.

The discharge duct 27 leads to a distributing duct 31 which is immediately beneath the deck-head and leads from the plenum chamber 21 to the ship-side 12 (or 11), thence along the ship-side to bulkhead 16. This duct tapers, as clearly shown in Fig. 1. It is subdivided by a partition 32 into two passages 33 and 34 (see Fig. 8). A splitter damper 30 (Fig. 4) is used to apportion flow between ducts 33 and 34. It is adjusted when the room is first put into use and need not thereafter be changed.

Passage 34 discharges air across the deck-head through outlets 35 which have manually adjustable dampers. Passage 33 discharges air down the ship-side and the bulkheads behind an apron 36. Flow is controlled by an adjustable baffle 37, which, like the splitter damper, need be adjusted only once.

A return air duct extends along the center line of the ship immediately beneath the deck-head, and leads to the plenum chambers 21. Because of the hatchway 19 this duct cannot be a straight duct along the axis of the ship, as otherwise it would be. It starts as a straight mid-ship duct 41, passes in two branches 42 and 43 around the hatchway 19 and continues as ducts 44 and 45 to respective plenum chambers.

The return air duct has lateral entrance ports 46, each controlled by dampers 47 which are actuated by damper motors 48. In the bottom of the return air ducts are flanged openings 49 (four being shown in Fig. 1). To these are releasably attached extension ducts 51 which extend downward nearly to the deck. Dampers 52 operated by damper motors control the openings 49. The damper motors are so arranged that dampers 47 open as dampers 52 close and vice versa.

When meat is being carried, the extensions 51 are in place and dampers 52 normally are open and dampers 47 closed, so that usually all return air enters the return ducts substantially at deck level. If the temperature differential exceeds the chosen maximum, dampers 52 move slightly in a closing direction and dampers 47 open slightly to pass some air upward through the carcasses.

When cargo other than meat is being carried extensions 51 are preferably removed (simply to make available the space which they occupy) and dampers 52 are disconnected from the damper motor and fixed in closed position. The cargo is stacked on the floor gratings 53 in such a way as to afford free vertical air paths through the cargo. The gratings 53 are removable and can be removed when meat is carried, but this is not necessary and commonly the gratings are left in place.

Thus, both arrangements provide for enveloping flows of air. When the space is arranged for meat this is substantially the only flow. In any event, the flow in contact with the meat is minimized. With the other type of cargo, all the return air is caused to flow upward in contact with the cargo.

The dampers 47 control the rate of air flow in contact with either type of cargo. In practice they are controlled by the differential between discharge air temperature, sensed at T1, and the temperature of air which has passed in contact with the cargo, sensed at T2. Commercial differential thermostats are available and are adjustable to respond to two temperatures T1 and T2, each over a considerable range. The invention is not concerned with mechanical details of automatic control, as these can be variously arranged with known mechanisms.

The evaporators 24 can be controlled to operate at different temperatures by any means known in the refrigerating art. The rate of air circulation also is controllable, preferably by varying the speed of the fan motors 26.

Another scheme of control for meat is to control so far as conditions permit by adjusting dampers 47. In extreme cases where full opening of dampers 47 does not suffice the dampers 52 may be partly closed manually, forcing more air to flow up through the cargo. At the other extreme, where dampers 47 tend to close, the fans are slowed, reducing the circulatory rate.

With fruit or frozen cargoes the control is still by dampers 47, the controlling temperatures T1 and T2 being appropriately chosen, but dampers 52 are maintained tightly closed. In extreme cases the operating temperature of the evaporators is changed to widen the range of control.

The use of two cooling units assures balanced feed to both pairs of ducts 33, 34, and is preferred but it is not always necessary to use two units.

The splitter 30, the adjustable dampers at 35 and the adjustable members 37, permit proper proportioning of air flows as between deck-head on the one hand, and ships-side and deck on the other. As stated, once they have been properly adjusted, they need never be changed.

What is claimed is:

1. The combination of means enclosing a thermally insulated storage space, said means comprising side walls, floor and ceiling; a refrigerative air-cooler; air propelling means associated with said air-cooler; duct means associated with said storage space and cooler and adapted to cause cooled air to flow from the cooler along the ceiling, side walls and floor in thin streams so as to enclose the core of the cargo space in a substantially continuous envelope of flowing refrigerated air; and interchangeable air return means serving to control the return of air from said envelope to said cooler and capable of arrangement alternatively to cause the return flow substantially to by-pass material stored in the core of said space, or to flow across the core of the space in contact with the stored material.

2. The combination defined in claim 1 in which the interchangeable return means comprise ducts adjacent the ceiling with damper controlled inlets, and damper controlled extensions leading from points adjacent the floor and remote from the side walls, to said ducts.

3. The combination of means enclosing a thermally insulated storage space, said means comprising side walls, floor and ceiling; a refrigerative air-cooler; air propelling means associated with said air-cooler; duct means associated with said storage space and cooler and adapted to cause cooled air to flow from the cooler along the ceiling and back to the cooler and from the cooler down the side walls and at least part way across the floor, said flows being in thin streams which serve to enclose the core of the cargo space in a substantially continuous envelope of flowing refrigerated air; and interchangeable means serving to control the return of air from said envelope as it flows over the floor and which can be arranged alternatively to cause the return flow substantially to by-pass stored material in the core of said space or to flow across the core of the space in contact with the stored material.

4. The combination defined in claim 3 in which ducts adjacent the ceiling have damper controlled inlets, and removable extensions are provided to afford other inlets to said ducts, which lead from points adjacent the floor and remote from the side walls.

5. The combination defined in claim 3 in which the duct means comprises a duct for discharging air across the ceiling and a duct for discharging air down the side walls; and means are provided to vary the relative quantities of air passing through the ducts just mentioned.

6. The combination defined in claim 3 in which the duct means comprises a duct for discharging air across the ceiling and a duct for discharging air down the side walls; and means are provided to vary the relative quantities of air passing through the ducts just mentioned, comprising an adjustable splitter damper at the entrance to said ducts and adjustable dampers serving to control the rates of discharge therefrom.

7. The combination defined in claim 3 in which the air propelling means is controllable to vary the rate of air flow.

8. The combination defined in claim 3 in which the air propelling means is controllable to vary the rate of air flow, and the refrigerative cooler is controllable as to the temperature at which it operates.

9. The combination of means enclosing a thermally insulated storage space, said means comprising side walls, floor and ceiling; refrigerative air-cooling means; air-propelling means associated with said air-cooling means; duct means arranged to receive refrigerated air propelled by said propelling means and direct a part of it in thin horizontal streams which flow adjacent said ceiling and away from said side walls, and also direct another part of it in thin vertical streams which flow downward along said side walls whence the air is free to flow horizontally across said floor in directions away from said side walls; and return duct means leading to said refrigerative air cooling means from points remote from said side walls, some of which are adjacent said floor and the remainder of which are adjacent said ceiling, whereby an enveloping flow of refrigerated air is induced within and adjacent said enclosing means.

JAMES SCOTT.

REFERENCES CITED

The following references are of record in the file of this patent:

UNITED STATES PATENTS

| Number | Name | Date |
|---|---|---|
| 1,882,030 | Pennington | Oct. 11, 1932 |
| 1,913,857 | Scherer | June 13, 1933 |
| 2,259,007 | Story | Oct. 14, 1941 |
| 2,314,361 | Williams | Mar. 16, 1943 |